United States Patent
Kraus

(10) Patent No.: US 12,536,694 B2
(45) Date of Patent: Jan. 27, 2026

(54) APPARATUS FOR POSITIONING A VEHICLE AT A LOADING AND/OR UNLOADING POINT

(71) Applicant: Deutsche Post AG, Bonn (DE)

(72) Inventor: Sascha Kraus, Obertshausen (DE)

(73) Assignee: Deutsche Post AG, Bonn (DE)

( * ) Notice: Subject to any disclaimer, the term of this patent is extended or adjusted under 35 U.S.C. 154(b) by 205 days.

(21) Appl. No.: 18/588,881

(22) Filed: Feb. 27, 2024

(65) Prior Publication Data

US 2024/0289983 A1  Aug. 29, 2024

(30) Foreign Application Priority Data

Feb. 28, 2023  (DE) .................... 10 2023 104 951.8

(51) Int. Cl.
*G06T 7/73* (2017.01)
*G01S 17/931* (2020.01)

(52) U.S. Cl.
CPC .............. *G06T 7/73* (2017.01); *G01S 17/931* (2020.01); *G06T 2207/20021* (2013.01)

(58) Field of Classification Search
CPC ........................ G06T 7/73; G06T 2207/20021; G01S 17/931
USPC ......................................................... 340/937
See application file for complete search history.

(56) References Cited

U.S. PATENT DOCUMENTS

| | | | | |
|---|---|---|---|---|
| 6,693,524 | B1 * | 2/2004 | Payne | ........................ B60R 1/26 |
| | | | | 348/E7.086 |
| 2015/0375947 | A1 * | 12/2015 | Hochstein | ................ G01V 8/20 |
| | | | | 250/216 |
| 2020/0024090 | A1 * | 1/2020 | Mushynski | ............ G08G 1/005 |
| 2022/0144564 | A1 * | 5/2022 | Hoofard | ................. B65G 69/24 |

FOREIGN PATENT DOCUMENTS

| | | |
|---|---|---|
| DE | 102005036794 A1 | 2/2007 |
| DE | 102011102549 A1 | 11/2012 |
| DE | 102016213889 A1 | 2/2018 |
| DE | 102021206027 A1 | 12/2022 |
| EP | 3718936 A1 | 10/2020 |

OTHER PUBLICATIONS

German Office Action (w/ Machine Translation) for corresponding Application No. 102023104951.8, dated Oct. 5, 2023, 12 pages.
Extended European Search Report for corresponding Application No. 24160070.9, dated Jul. 4, 2024, 8 pages.

* cited by examiner

*Primary Examiner* — Kerri L Mcnally
(74) *Attorney, Agent, or Firm* — Dority & Manning, P.A.

(57) ABSTRACT

The invention relates to a method for positioning a vehicle, in particular a lorry, at a loading and/or unloading point, comprising at least one sensor for detecting a position of the vehicle, an evaluation unit for determining a distance between the vehicle and the loading and/or unloading point depending on the detected position of the vehicle, and a display unit for visualising feedback to a driver of the vehicle depending on the distance between the vehicle and the loading and/or unloading point, wherein the at least one sensor and the display unit are designed for mounting on the loading and/or unloading point. In this way, an apparatus for positioning a vehicle is provided, with which any vehicle can be positioned reliably and precisely at a predetermined point, irrespective of the vehicle type or vehicle equipment.

12 Claims, 5 Drawing Sheets

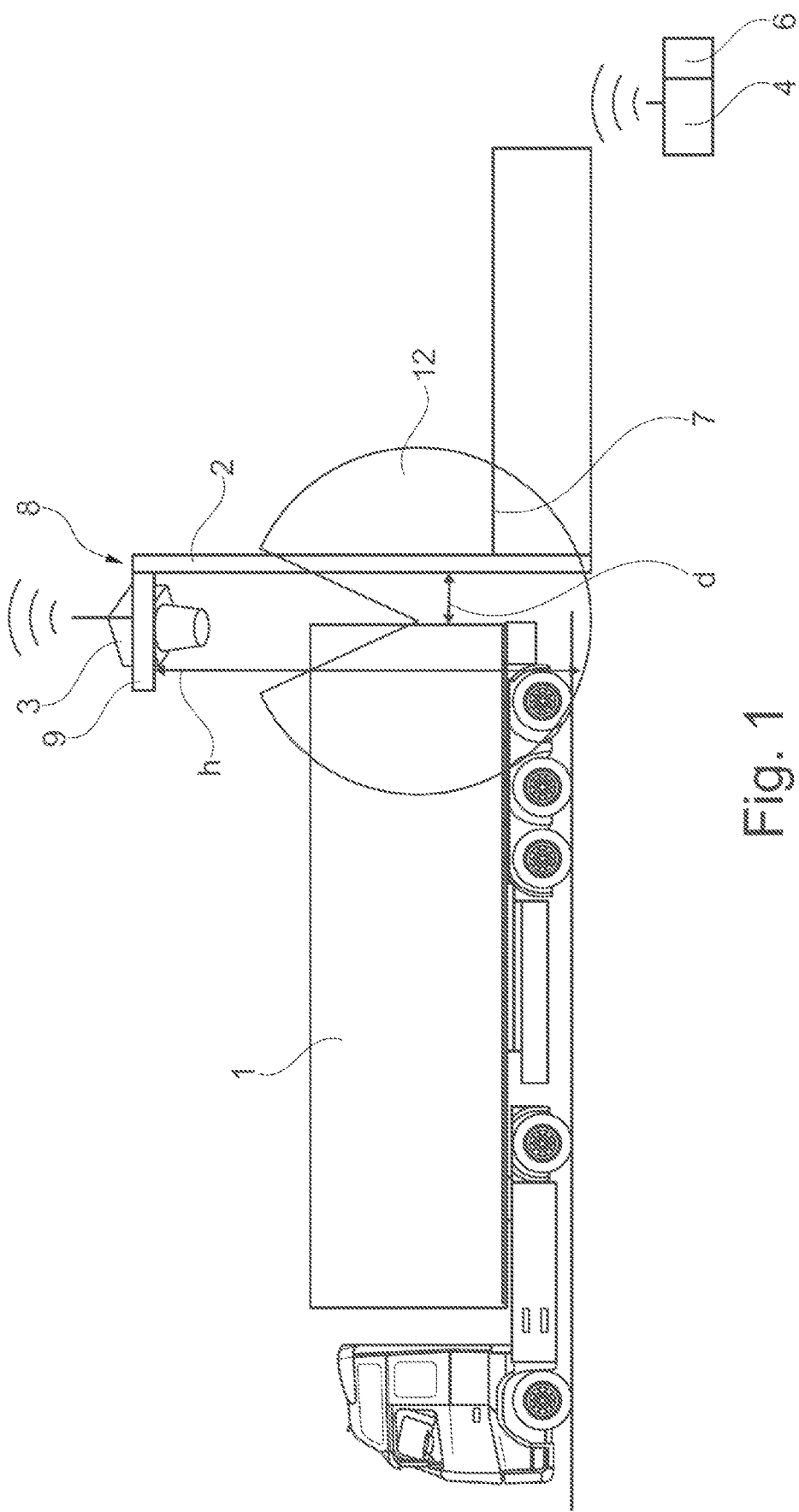

APPARATUS FOR POSITIONING A VEHICLE AT A LOADING AND/OR UNLOADING POINT

CROSS-REFERENCE TO RELATED APPLICATIONS

Figure 2A:
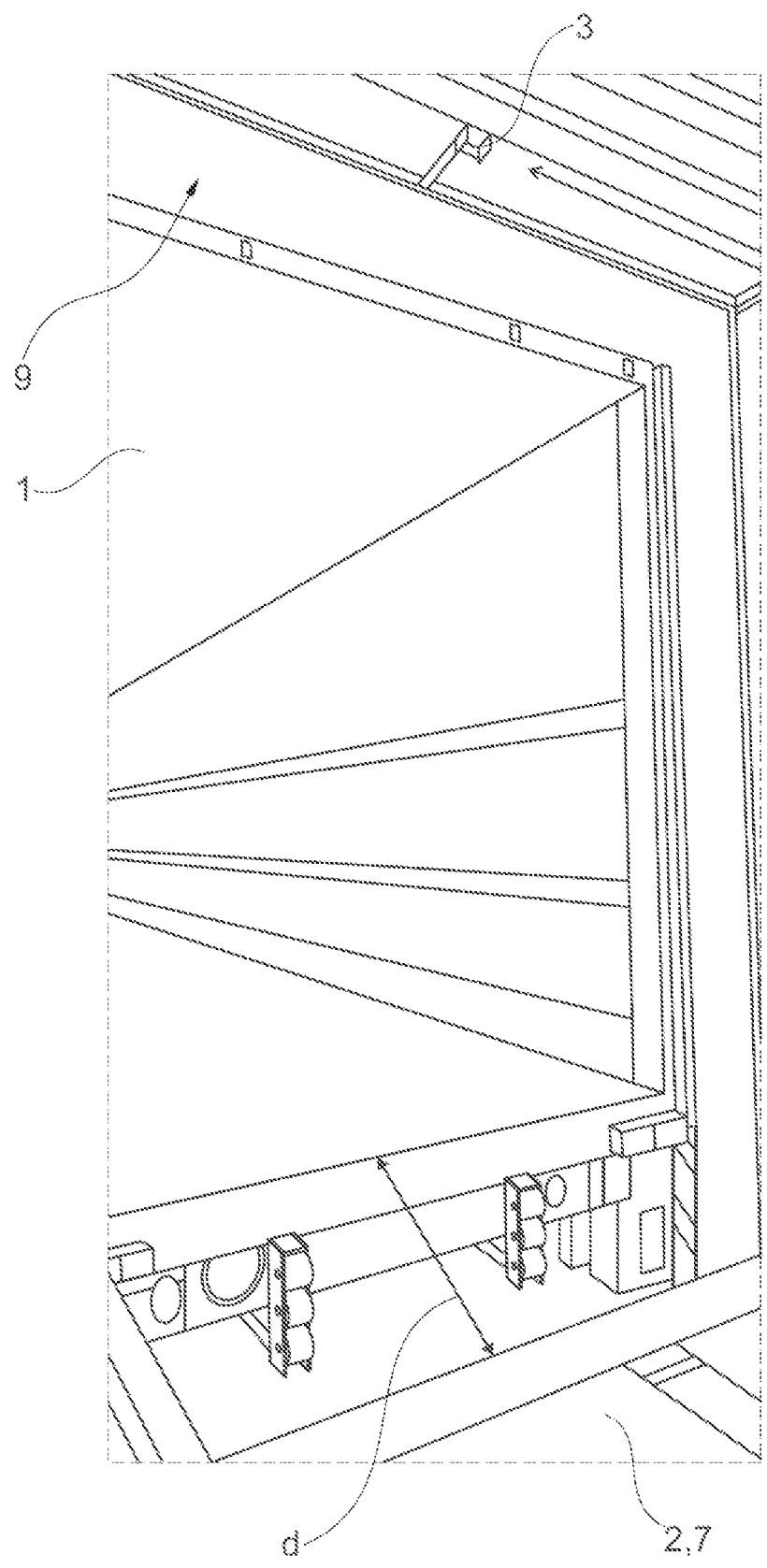

The present application is based upon and claims the right of priority to German Patent Application Number 10 2023 104 951.8, filed Feb. 28, 2023, the disclosure of which is hereby incorporated by reference herein in its entirety for all purposes.

The invention relates to an apparatus for positioning a vehicle, in particular a lorry, at a loading and/or unloading point.

When loading and/or unloading a vehicle, in particular a lorry, it is necessary for the vehicle to be driven backwards to a loading and/or unloading point. This situation is a daily challenge, especially when loading goods in the commercial sector. The lorries carry various structures that can be loaded with the goods. Neither the lorries nor the structures or swap bodies have the distance warning systems familiar from the automotive industry. Due to the constant change of structures or swap bodies, such technology would not be feasible anyway, as each swap body would have to have its own corresponding sensor system.

Correct positioning of the lorry is particularly important, as too great a distance or gap between the lorry and the loading and/or unloading point, in particular the loading ramp, represents an enormous risk of injury for the loading personnel during loading and/or unloading. Accidents at work and staff absences are the result. Driving the lorry too near or too close to the loading and/or unloading point leads to collisions. This regularly causes considerable damage to the loading and/or unloading points as well as to the lorries, swap bodies or other structures. Manual manoeuvring by additional personnel can lead to accidents and an increased risk of injury, as the space required between the lorry and the loading and/or unloading point within the driver's field of vision is very limited.

The apparatuses or methods known from the prior art do not yet make it possible to provide a means of reliably and precisely driving a vehicle to a loading and/or unloading point without its own corresponding sensor system.

Based on this, it is the object of the invention to provide an apparatus for positioning a vehicle with which any vehicle can be positioned reliably and precisely at a predetermined point, irrespective of the vehicle type or the vehicle equipment.

This object is achieved by the subject of claim 1. Preferred developments can be found in the subordinate claims.

According to the invention, an apparatus for positioning a vehicle, in particular a lorry, at a loading and/or unloading point is thus provided, comprising at least one sensor for detecting a position of the vehicle, an evaluation unit for determining a distance between the vehicle and the loading and/or unloading point depending on the detected position of the vehicle, and a display unit for visualising feedback to a driver of the vehicle depending on the distance between the vehicle and the loading and/or unloading point, wherein the at least one sensor and the display unit are designed for mounting on the loading and/or unloading point.

It is thus a decisive point of the invention that the apparatus is arranged at the positioning location and that the driver of a vehicle can be provided with feedback regarding the distance between the vehicle and the loading and/or unloading point during the positioning process, irrespective of the vehicle.

When it is mentioned in the present case that the at least one sensor and the display unit are designed for mounting at the loading and/or unloading point, it is meant that the at least one sensor and the display unit are basically designed for mounting on a wall and/or on a ceiling and it is intended that the at least one sensor and the display unit are arranged at the loading and/or unloading point in the operational state.

The term "operational state" is understood here to mean the state in which the apparatus is mounted and ready for operation. This means that the at least one sensor and the display unit are designed so as to be mounted at the loading and/or unloading point. The evaluation unit can be positioned as required. Once installation is complete, the apparatus is in the operational state and can be used.

The loading and/or unloading point can be any chosen reference point. In particular, the loading and/or unloading point can be provided at a loading ramp, in a parking space, in a garage or in a hall. Loading and/or unloading refers in particular to any interaction with the vehicle for which the vehicle must be parked at a predefined location or position.

Preferably, the loading and/or unloading point is the centre point of a loading ramp in the horizontal direction or the centre point of a parking space in the horizontal direction.

According to a preferred development of the invention, the at least one sensor comprises a LiDAR sensor. LiDAR is a method related to radar for optical distance and speed measurement as well as for remote measurement of atmospheric parameters. It is a form of three-dimensional laser scanning. Laser beams are used instead of radio waves as in radar. LiDAR systems emit laser pulses and detect the backscattered light. The distance to the location of the scattering is calculated from the time of flight of the signals. In particular, the LiDAR sensor can be used to scan a range from 0° to at least 270°. The measurement between the vehicle and the loading and/or unloading point is therefore independent of the contour of the vehicle. The LiDAR sensor detects the outer contour and can therefore determine a distance between the vehicle and the loading and/or unloading point.

It is preferable that the apparatus for detecting more complex contours has multiple sensors, in particular multiple LiDAR sensors. Multiple LiDAR sensors allow not only the detection of a two-dimensional contour, but also the detection of a three-dimensional image of the vehicle. In this way, not only vehicles with symmetrical outer contours, such as the rectangular bodies of lorries, but also vehicles of different shapes can be detected. The apparatus is therefore suitable for a large number of different vehicles that have to be driven up to a loading and/or unloading point.

According to a preferred development of the invention, the apparatus has an interface that is configured for communication with external systems. An external system can be a roller shutter, for example. If the vehicle is positioned correctly, i.e. the distance between the vehicle and the loading and/or unloading point corresponds to a predetermined target value, further systems can be controlled depending on this. With regard to the aforementioned roller shutter, the roller shutter on a loading ramp can be opened, for example, when the vehicle has reached the target position. Conversely, it is therefore possible to keep the roller shutter closed during the positioning process until the target position is reached in order to prevent accidents and injuries. Other external systems can be, for example, autonomous means of transport that can be controlled depending on the vehicle position in relation to the respective door.

According to a preferred development of the invention, the loading and/or unloading point has a loading ramp and a door adjacent to the loading ramp. Preferably, the at least one sensor is arranged on an upper part of the door in the operational state. The apparatus and the interaction of the components are therefore preferably configured so that the sensor is arranged at a central point above the door. The positioning of the at least one sensor on an upper edge of the door enables the vehicle to be detected from the top downwards in the direction of the ground. Furthermore, as already explained, a range from 0° to at least 270° C. an be scanned with the aid of the LiDAR sensor. Due to the positioning at the upper area of the door, the remaining highest 90° are arranged around the sensor and directed upwards, so that in the area between the vehicle, the roadway and the loading and/or unloading point there are no areas that cannot be detected by means of the at least one sensor and the vehicle can be reliably detected without invisible areas.

According to a preferred development of the invention, the at least one sensor is arranged at a height of at least 3.5 m, preferably at least 3.8 m, particularly preferably at least 4 m. As already explained, the positioning of the at least one sensor at an upper edge of the door enables the vehicle to be detected from the top downwards in the direction of the ground. If the at least one sensor is positioned at a height of at least 3.5 m, preferably at least 3.8 m, particularly preferably at least 4 m, it is possible to detect the ground or the roadway in an area, particularly up to 25 m in front of the loading and/or unloading point. A conventional swap body has a length of approx. 7 m to 8 m. Adding the length of the lorry or driver's cab, total lengths of up to 10 m are realistic. Due to the detectable distance of up to 25 m in front of the target point, i.e. the loading and/or unloading point, the driver can be guided at an early stage and the positioning process can be detected at an early stage, so that reliable distance measurement can be guaranteed.

According to the invention, a method for positioning a vehicle at a loading and/or unloading point by means of an apparatus according to one of the preceding claims is also provided, having the following method steps:
S1) detecting a position of the vehicle by means of the at least one sensor,
S2) determining a distance between the vehicle and the loading and/or unloading point depending on the position of the vehicle,
S3) categorising the position of the vehicle and outputting feedback to the driver by means of the display unit,
S4) iteratively repeating steps S1) to S3) until the positioning process is completed.

It is thus a decisive point of the invention that the positioning process of the vehicle at the loading and/or unloading point is continuously measured. The position of the vehicle is recorded and the distance to the loading and/or unloading point is determined. Depending on the distance, the driver is given feedback regarding the distance and the current status during the positioning process. The positioning process is completed when a predetermined distance between the vehicle and the loading and/or unloading point, in particular plus a tolerance range, has been reached or has not been exceeded.

According to a preferred development of the invention, the position of the vehicle is categorised into at least three categories, the categories comprising "forwards", "stop" and "backwards". The position of the vehicle is categorised as "backwards" if the distance between the vehicle and the loading and/or unloading point is greater than a target value and the vehicle must be moved "backwards" closer to the loading and/or unloading point in order to reach the target position. The position of the vehicle is categorised as "forwards" if the distance between the vehicle and the loading and/or unloading point is less than the target value and the vehicle must be moved away and "forwards" of the loading and/or unloading point in order to reach the target position. The position of the vehicle is categorised as "stop" if the distance between the vehicle and the loading and/or unloading point corresponds to the target value and the vehicle has reached the target position and does not need to be moved forwards or backwards. Visual feedback is output on the display unit according to the category. The display unit preferably comprises a traffic light system. In particular, an arrow pointing in the corresponding direction of travel is displayed for the "forwards" and "backwards" categories and a red dot is displayed for the "stop" category.

According to a preferred development of the invention, the method comprises the following further method steps:
S1a) dividing a virtual image of the roadway in front of the loading and/or unloading point into multiple virtual fields,
S1b) recognising a contour of the vehicle, and
S1c) determining the position of the vehicle on the basis of the contour and the virtual fields.

The LiDAR sensor is used to detect the surroundings around the loading and/or unloading point, including the roadway leading to the loading and/or unloading point. The roadway is recognised and the corresponding virtual image is superimposed with a virtual grid of fields, so that the real recognised roadway or the image is divided into multiple virtual fields. The fields are used to determine the distance. The fact that the sensor is not arranged at the height of the loading and/or unloading point and the distance measurement is therefore not performed on a horizontal axis, but from an angle above, makes the distance measurement significantly more complex. The division of the roadway into multiple virtual fields and the recognition of the contour of the vehicle within these fields make it possible to determine the distance between the vehicle and the loading and/or unloading point from an external third point, in particular with a distorted viewing direction from diagonally above.

According to a preferred development of the invention, the virtual fields each have a field size of at most 10 cm×10 cm, preferably at most 5 cm×5 cm, particularly preferably at most 2 cm×2 cm. In particular, the field geometry can be square or rectangular. In the case of a rectangular geometry, a first side of the field has a maximum length of the maximum field size, while the second side of the field is smaller than the first side of the field. Due to the field size, a high resolution and accuracy of the positioning can be guaranteed. The vehicle can preferably be moved up to 2 cm precisely to the loading and/or unloading point.

According to the invention, the use of the apparatus described above for positioning a lorry at a loading ramp in accordance with the method described above or the use of a method as described above for positioning a lorry at a loading ramp is also provided. Accordingly, the invention provides that the apparatus for positioning a vehicle at a loading and/or unloading point is explicitly used for positioning a lorry at a loading ramp. The lorry is reversed up to the loading ramp in order to load or unload the lorry or a corresponding structure via the loading ramp. In particular, the loading ramp comprises a door at which the lorry must be precisely positioned.

In the following, the invention is explained in further detail with reference to the drawings by means of a preferred exemplary embodiment.

Figures 2B, 2C:
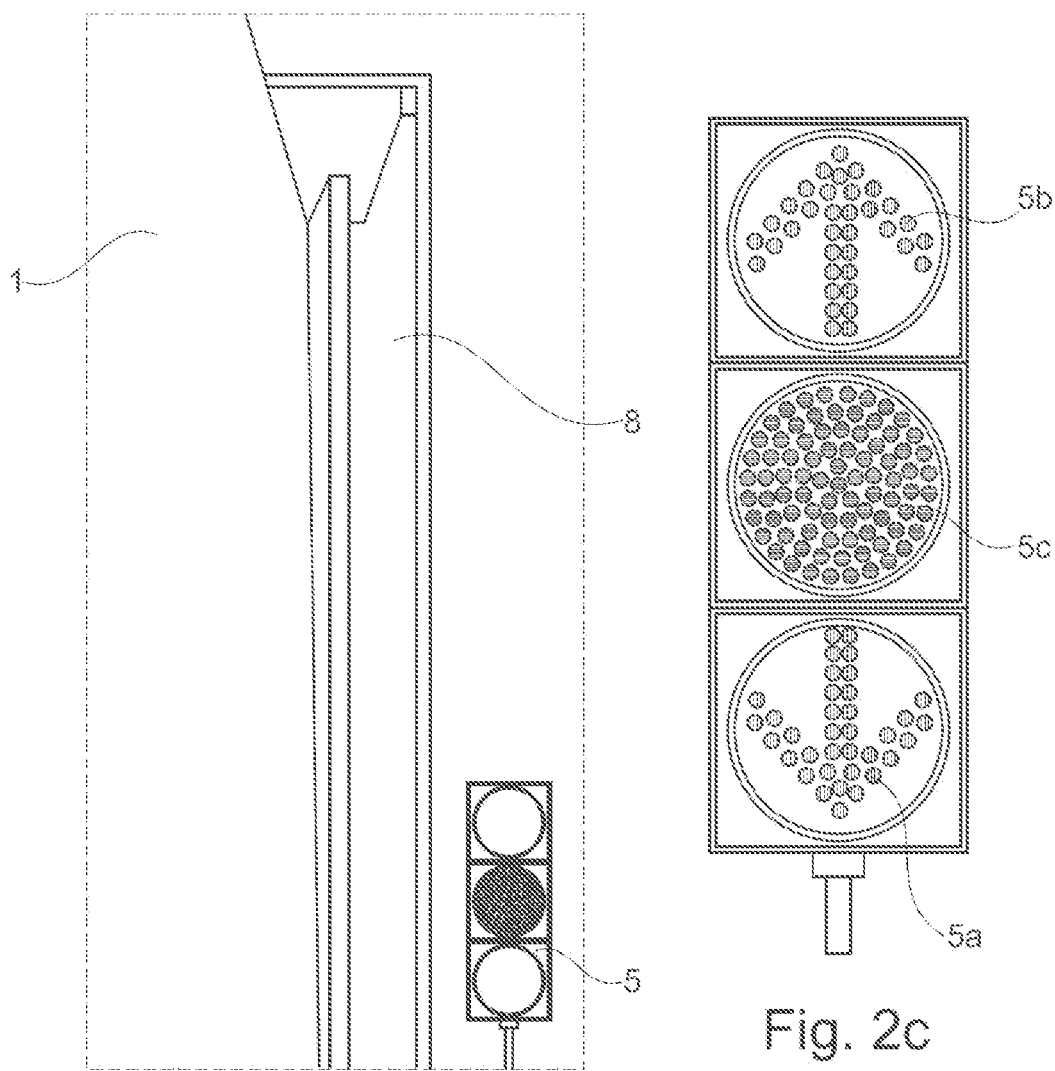
Figure 3:
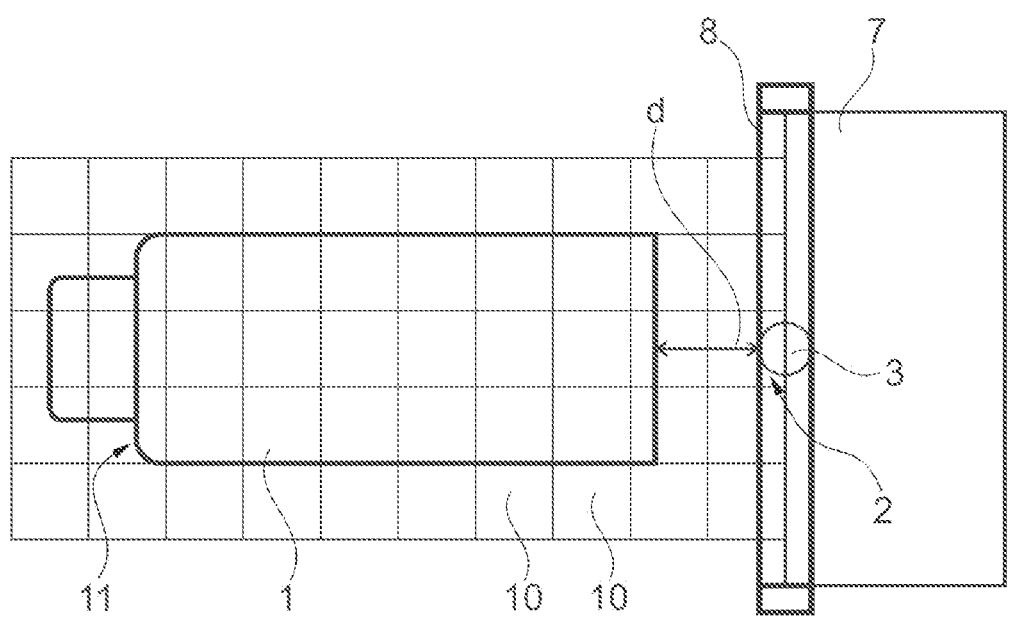
Figure 4:
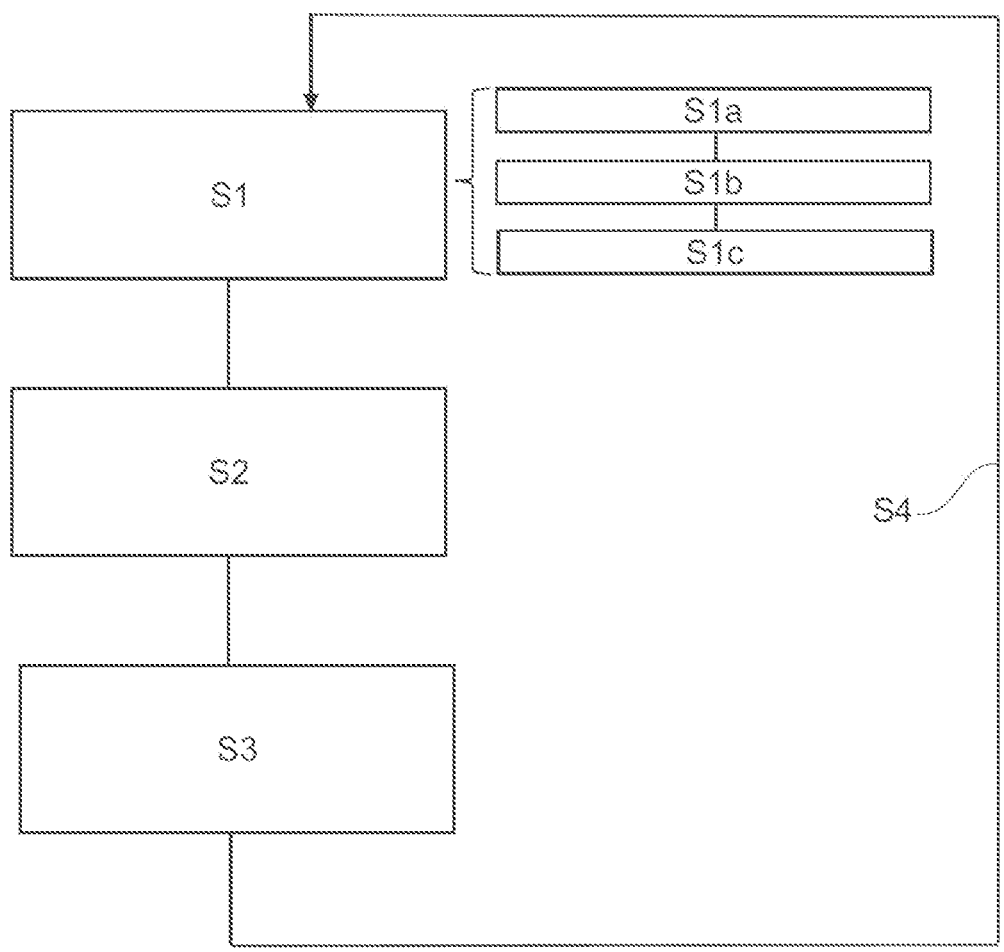

In the drawings:

FIG. 1 schematically shows an apparatus for positioning a vehicle according to a preferred exemplary embodiment of the invention, FIG. 2a, b schematically show an apparatus for positioning a vehicle according to a preferred exemplary embodiment of the invention in a perspective view, FIG. 2c schematically shows a display unit according to a preferred exemplary embodiment of the invention in a perspective view, FIG. 3 schematically shows a virtual image of a vehicle according to a preferred exemplary embodiment of the invention in a top view, FIG. 4 shows a flow diagram of a method for positioning a vehicle according to a preferred exemplary embodiment of the invention.

FIG. 1 schematically shows an apparatus for positioning a vehicle 1 according to a preferred exemplary embodiment of the invention. The vehicle 1, shown here using the example of a lorry, is driven backwards to a loading ramp 7. The loading ramp 7, together with the door 8, represents the loading and/or unloading point 2 at which the vehicle 1 is to be positioned. A sensor 3 is arranged on an upper part 9 of the door 8. The sensor 3 detects its surroundings within the marked detection area 12 and transmits the data to an evaluation unit 4. The height h of the sensor determines the range of the detection area 12. The sensor 3 detects the outer contour of the vehicle 1 and thus determines the position of the vehicle 1. Depending on the position of the vehicle 1 and the loading and/or unloading point 2, a distance d is determined by means of the evaluation unit 4. A target value is stored for the distance d. Depending on whether the distance d between the vehicle 1 and the loading and/or unloading point 2 is greater than, less than or equal to the target value, a corresponding signal is output to the driver of the vehicle 1 via the display unit 5 not shown in FIG. 1. An interface 6 can also be used to control external systems, such as a roller shutter, depending on the distance d determined between the vehicle 1 and the loading and/or unloading point 2. If, for example, the vehicle 1 is positioned correctly, i.e. the distance d corresponds to the target value, the roller shutter can be opened automatically.

FIGS. 2a and 2b schematically show the apparatus for positioning a vehicle 1 according to a preferred exemplary embodiment of the invention in a perspective view. FIG. 2a shows the view from the loading ramp 7 in the direction of the vehicle 1. FIG. 2b, on the other hand, shows the view from the side of the vehicle 1 in the direction of the loading ramp 7 or the door 8.

FIG. 2a shows that the sensor 3 is arranged on an upper part 9 of the door 8. The sensor 3 is arranged in the centre in a horizontal direction so that the vehicle 1 and the loading and/or unloading point 2 or the loading ramp 7 are detected by means of the sensor 3 from diagonally above. The distance d between the outer contour of the vehicle and the loading and/or unloading point 2 is determined. As shown here, the sensor 3, which is used as an aid for positioning the vehicle 1, is not part of the vehicle 1, but is mounted on the door 8 or on the upper part 9 of the door 8 or on the ceiling in the operational state.

FIG. 2b shows the associated display unit 5, which is attached to the outside of the door 8. The vehicle 1 is driven backwards to the door 8. The section shown in FIG. 2b corresponds to the driver's view through the side mirror when positioning the vehicle 1. The distance d between the vehicle 1 and the loading ramp 7 or the door 8 cannot be estimated from this viewing angle. The display unit 5 shows the driver whether he needs to drive forwards or backwards or whether the target position has been reached. The display unit 5 can be designed like a traffic light. FIG. 2c shows the respective visualised feedback signals. The display unit 5 shows the forwards arrow 5a if the vehicle 1 is too close to the loading and/or unloading point 2 and the driver must move the vehicle 1 forwards again in order to reach the target position. The display unit 5 shows the backwards arrow 5b if the vehicle 1 is too far away from the loading and/or unloading point 2 and the driver has to move the vehicle 1 further backwards in order to reach the target position. The display unit 5 shows the red dot as stop 5c when the vehicle 1 is at the target position.

FIG. 3 schematically shows a virtual image of a vehicle 1 according to a preferred exemplary embodiment of the invention in a top view. The vehicle 1 is shown being driven backwards in front of the loading and/or unloading point 2 or in front of the door 8. The sensor 3 detects the roadway 11 and the vehicle 1 and maps the scene virtually. The roadway 11 is divided into multiple virtual fields 10. The field size shown in FIG. 3 is not to scale. The field size has a maximum size of up to 2 cm×2 cm, so that the vehicle can be steered precisely to within 2 cm of the loading ramp 7 or door 8. The virtual fields 10 are used to be able to determine the position of the vehicle 1 even from a distorted viewing angle from diagonally above relative to the loading and/or unloading point 2. The fact that the sensor 3 is not arranged on the same horizontal plane as the loading and/or unloading point means that spatial distortions can be compensated for in this way when determining the distance d between the vehicle 1 and the loading and/or unloading point 2.

FIG. 4 shows a flow diagram of a method for positioning a vehicle according to a preferred exemplary embodiment of the invention. In a first step S1, the position of the vehicle 1 is detected by means of the at least one sensor 3. This step S1 comprises the substeps S1a to S1c. In order to detect the position of the vehicle 1, a virtual image of the roadway 11 is first created and divided into multiple virtual fields 10. The contour of the vehicle 1 is then recognised and subsequently sorted into the grid of the multiple fields 10, so that the position of the vehicle 1 is determined using the detected contour and the virtual fields 10. After the position of the vehicle 1 has been determined, the distance d between the vehicle 1 and the loading and/or unloading point 2 is determined in the next step S2, depending on the position of the vehicle 1. Depending on how large the distance d or the deviation from a predefined target value is, the position of the vehicle 1 is categorised in a subsequent step S3 and feedback is given to the driver ("forwards", "stop", "backwards") by means of the display unit 5. These aforementioned steps are repeated iteratively until the distance d corresponds to the target value, the vehicle 1 is parked and the positioning process is completed.

LIST OF REFERENCE SYMBOLS

1 Vehicle
2 Loading and/or unloading point
3 Sensor
4 Evaluation unit
5 Display unit
6 Interface
7 Loading ramp
8 Door 9 Upper part
10 Virtual field
11 Roadway
12 Detection area
d Distance
h Height

The invention claimed is:

1. Method for positioning a vehicle at a loading and/or unloading point by means of an apparatus comprising
at least one sensor for detecting a position of the vehicle,
an evaluation unit for determining a distance between the vehicle and the loading and/or unloading point depending on the detected position of the vehicle, and
a display unit for visualising feedback to a driver of the vehicle depending on the distance between the vehicle and the loading and/or unloading point, wherein the at least one sensor and the display unit are designed for mounting on the loading and/or unloading point, having the following method steps:
S1) detecting a position of the vehicle by means of the at least one sensor,
S1a) dividing a virtual image of the roadway ft in front of the loading and/or unloading point into multiple virtual fields,
S1b) recognising a contour of the vehicle,
S1c) determining the position of the vehicle on the basis of the contour and the virtual fields,
S2) determining a distance between the vehicle and the loading and/or unloading point depending on the position of the vehicle,
S3) categorising the position of the vehicle and outputting feedback to the driver by means of the display unit, and
S4) iteratively repeating steps S1) to S3) until the positioning process is completed.

2. Method according to claim 1, wherein the categorisation of the position of the vehicle is carried out in at least three categories, the categories comprising "forwards", "stop" and "backwards".

3. Method according to claim 1, wherein the virtual fields each have a field size of at most 10 cm×10 cm.

4. Method according to claim 1, wherein the at least one sensor comprises a LiDAR sensor.

5. Method according to claim 1, wherein the apparatus has an interface which is configured for communication with external systems.

6. Method according to claim 1, wherein the loading and/or unloading point comprises a loading ramp and a door that is adjacent to the loading ramp, and the at least one sensor is arranged at an upper part of the door in the operational state.

7. Method according to claim 1, wherein the at least one sensor is arranged at a height of at least 3.5 m.

8. Use of a method according to claim 1 for positioning a lorry at a loading ramp.

9. Method according to claim 3, wherein the virtual fields each have a field size of at most 5 cm×5 cm.

10. Method according to claim 9, wherein the virtual fields each have a field size of at most 2 cm×2 cm.

11. Method according to claim 7, wherein the at least one sensor is arranged at a height of at least 3.8 m.

12. Method according to claim 11, wherein the at least one sensor is arranged at a height of at least 4 m.

* * * * *